United States Patent Office 2,899,625
Patented Aug. 11, 1959

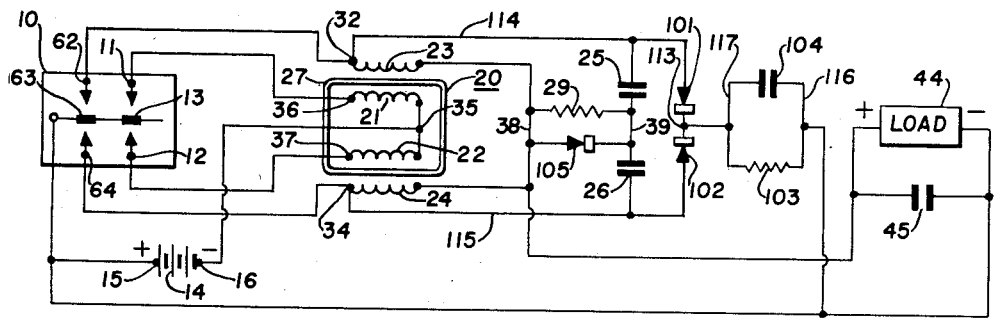

2,899,625

CONVERTER SYSTEM HAVING LOAD ENERGY ABSORPTION MEANS

Harold J. Brown, Indianapolis, Ind.

Application March 9, 1954, Serial No. 414,970

12 Claims. (Cl. 321—2)

My invention relates in general to vibrator conversion systems, and in particular, to circuit arrangements to prevent the usual contact point damage which is associated with the making and breaking of electrical circuits.

An object of my invention is to provide a circuit which will eliminate the damage to the vibrator contacts so that the vibrator will have superior life and reliability at any given power level.

Another object is to provide increased power handling rating for any given vibrator, thus obviating the necessity for larger vibrators or for a plurality of contact points.

Another object is to provide a superior consistency of life and performance, since present vibrator conversion systems are notoriously uncertain in their life expectancy.

Another object of my invention is to provide a circuit wherein the burden on the vibrator contacts is so reduced that smaller and higher frequency units may be used for the same life and load.

Another object of my invention is to provide a converter system having load energy absorption means.

Another object of my invention is to provide a circuit whereby the inductive energy associated with the load current is absorbed without damage to the load contacts.

Another object of my invention is to provide a circuit which will provide protection for the load contact without interference from the excitation system of the transformer.

Another object of my invention is the provision of a load current diverting circuit having absorption means connected across the load contacts for the purpose of absorbing the energy associated with the load current.

Other objects and a fuller understanding of the invention may be had by referring to the following description and claims, taken in conjunction with the accompanying drawings, in which:

Figure 1 is a diagrammatic illustration of a converter circuit embodying the features of my invention in the preferred form;

Figure 2 is a diagrammatic illustration of a converter circuit embodying the features of my invention in a modified practical form; and Figure 3 shows the decay curve of the load current in comparison to the decay curve of the prior art.

The converter system, in which my load current diverting circuit may be employed, may be substantially the same as that shown and described in my application Serial No. 333,912, entitled "Decoupled Converter System," now Patent No. 2,783,431. With reference to Figure 1, the decoupled converter system comprises, generally, an interrupter 10, a transformer 20, buffer capacitors 25 and 26, adapted to supply power to load 44.

The interrupter may be of any suitable design and comprises, generally, two opposed excitation contacts 11 and 12 and a vibrating contact 13 disposed therebetween, which is connected to a terminal 15 of a direct current source 14. The transformer 20 has a magnetic core 27 and two primary windings 21 and 22 and two secondary windings 23 and 24. The primary windings 21 and 22 have end terminals 36 and 37 and intermediate terminal 35, which is connected to the terminal 16 of the battery 14. The secondary windings 23 and 24 have end terminals 32 and 34 and intermediate terminals 38. Capacitors 25 and 26 are connected across end terminals 32 and 34 of the secondary windings of the power transformer, in series relationships. Terminal 39 is the common terminal of capacitors 25 and 26. A buffing resistor 29 is connected between terminal 39 and terminal 38 of the power transformer. A diode 105 may be connected in parallel with the buffing resistor 29 to improve the excitation characteristics. The diode 105 is an additional feature to my application Serial No. 333,912. The load 44 having a capacitor 45 thereacross is connected across terminal 38 and the vibrating element.

The magnetic circuit of the transformer may be either of the core type, as shown in Figure 4, or the shell type, as shown in Figure 5 of application Serial No. 333,912. The primary winding 21 and the secondary winding 23 constitute a pair of half-windings, and the primary winding 22 and the secondary winding 24 constitute an opposite pair of half-windings. As shown in Figure 1, the pair of primary winding 21 and secondary winding 23 are closely coupled with respect to each other as being concentrically mounted with each other over a common core portion. Similarly, the pair of primary winding 22 and secondary winding 24 are closely coupled with respect to each other as being concentrically mounted over another common core portion of the magnetic circuit. The half-windings of each pair are closely coupled with respect to each other, but the pairs as a unit are loosely coupled with respect to each other. During one-half of the cycle, the pair comprising the primary winding 21 and secondary winding 23 may be characterized as conducting primary and secondary half-windings, while the other pair comprising the primary winding 22 and secondary winding 24 may be characterized as non-conducting primary and secondary half-windings.

In the prior art, the circuit elements in the vibrator system do not, generally, absorb the energies associated with the load current. Therefore, the life and power limitations of the vibrator converter are related to the energies that may be absorbed by the contacts themselves. Although in the prior art, various means have been shown to reduce these load energies, nevertheless, as the life and power requirements become more rigorous, it becomes necessary to provide means of elimination of this contact energy dissipation altogether. By virtue of the fact that the load currents are of a much higher order of magnitude than are the currents associated with the excitation, it becomes necessary to provide energy suppression elements of a much lower order of magnitude of impedance than are those elements associated with suppression of the excitation contact phenomena.

Placement of the load suppression elements in the circuit must therefore be in a unique position with regard to the excitation voltages, as otherwise they would absorb excessive power or reactive volt amperes from the system thereby disabling the excitation contacts.

Figure 1 shows a load diverting circuit comprising diode elements 101 and 102, a resistor 103 and a capacitor 104 connected across load contacts 63, and 62 and 64 of the vibrator. The resistor 103 and capacitor 104 comprise an energy absorption circuit. The diode elements 101 and 102 are connected in back-to-back relationship and have an intermediate terminal 113 connected to the resistor 103 and the capacitor 104, and are so polarized as to be in the conductive direction when the corresponding load contacts are closed. Thus, the diode 101 will be capable of conducting current when the load contacts 63 and 64 are closed and in the same direction in which the current is flowing in the load contacts, and at the same time the diode 102 will be blocking with respect to the voltage generated by transformer 20. Similarly, the diode 102 will be capable of conducting current when the load contacts 63 and 62 are closed and in the same direction in which the current is flowing in the load contacts, and at the same time the diode 101 will be blocking with respect to the voltage generated by the transformer 20.

Upon separation of the load contacts 62 and 63 due to the normal action of the vibrator 10, the current in the whole circuit is undisturbed and will flow in the diode 102 and in the capacitor 104. With the passage of time, this circuit will charge the capacitor 104 with energy associated with the load current. This energy will be dissipated in the shunt resistor 103. Similarly, upon the separation of the contacts 62 and 64 due to the normal action of the vibrator, the current in the whole circuit is undisturbed and will flow in the diode 101 and the capacitor 104. With the passage of time, this current will charge capacitor 104 with the energy associated with the load current. This energy will be dissipated in the shunt resistor 103.

In a conventional vibrator, there is approximately one hundred micro seconds of time available between the opening of the load contacts 62, 63, and 64 and the opening of the excitation contacts 11, 13, and 12. In the prior art, opening of load contacts 62, 63, and 64 result in a fast decay of current by virtue of the high impedance associated with these contacts. This rapid change of current will be associated with a discharge at the contacts themselves with the result that the contacts are damaged and any substantial load will show firing, indicating that the inductive energy in the circuit is dissipated at the contacts. With my invention, current decay takes perhaps ten times as long, as shown in Figure 3, and the energy will not dissipate at the contacts. In Figure 3, the curve 50 shows the fast decay of prior art devices and the curve 51 shows a slow decay as effected by my invention. The point 52 represents the time at which the load circuit contacts are open and the point 53 indicates the time that the excitation contacts are open.

Figure 2 shows a practical circuit capable of high performance in which diode elements 30 and 31 act as power rectifiers to increase the voltage of the load 44 by rectifying the voltage generated in the windings 109 and 110 and by adding it to the voltage generated by windings 23 and 24. An output filter capacitor means consisting of two series elements 45 and 106 are connected to a midpoint 111. Connected between midpoint 111 and transformer midpoint 38 is the energy absorption circuit consisting of resistor 103 and capacitor 104. Thus, in Figure 2, my load diverting circuit is inductively connected across the load contacts 63, and 62 and 64 through windings 109 and 110 and diodes 30 and 31 and filter capacitor 106; whereas in Figure 1, my load diverting circuit is connected directly across the load contacts 63, and 62 and 64.

Operation of the secondary contacts 62, 63, and 64 in Figure 2 will cause the load current equivalent to flow through the absorption circuit having elements 103 and 104 and will cause most of the energy associated with the load current to be dissipated externally to the contacts.

Although Figure 2 is not an ideal suppression circuit, it nevertheless provides great improvement over the prior art and permits the diode elements to be available for the generation of a higher voltage than is generally practical for a self-rectifying vibrator system in itself.

The diode element 105 connected in parallel with resistor 29 of the excitation suppression circuit is used to improve the action of excitation contacts 11, 12, and 13 and is desirable in the event of alternating current loading of the transformer as distinct from the direct current loading. When the excitation contacts interrupt the transformer exciting current and any alternating current component of load which may be incidental to the operation of the system, diode 105 will act to short circuit resistor 29 and thus eliminate it from the circuit at this particular instant. However, on the opposite side of the cycle when the contacts make, the diode element will be in the blocking direction leaving resistor 29 in the circuit as therein needed for suppression of contact-make effects. This description also applies to Figure 1.

It must be pointed out that the selective action therein obtained can only exist in a single transformer circuit wherein substantial decoupling exists between primary windings 21 and 22. Thus with my decoupling transformer, the combination of resistor 29 and diode 105 permits transfer of energy from capacitors 25 and 26 to the transformer and incidental alternating current load with little opposition, since the diode is conducting, and greatly opposes the transfer of energy from the direct current source to the capacitors 25 and 26, since now the diode is blocking, which indicates the resistor 29 is in opposition.

In both Figures 1 and 2, I show a vibrator system having a vibrating contact 63 and opposed load interruption contacts 62 and 64 and having a transformer 20 provided with two secondary windings 23 and 24 with a neutral alternating current point 38 therebetween. The load current diverting circuit which diverts energy from the load contacts comprises two diodes which are identified in the Figure 1 by the reference characters 101 and 102 and which are identified in Figure 2 by the reference characters 30 and 31. Each of the diodes have first and second terminals with the second terminals being connected together and defining a common point therebetween. The common point between the two diodes in Figure 1 is indicated by the reference character 113 and the common point between the two diodes in Figure 2 is designated by the reference character 112. First circuit means connects the first terminals of the diodes respectively to the secondary windings of the transformer to impress a voltage on the diodes. In Figure 1, the first terminals of the diodes 101 and 102 are respectively connected to the secondary windings 23 and 24 of the transformer 20 by conductors 114 and 115. In Figure 2 the first terminals of the diodes 30 and 31 are respectively connected to the secondary windings 23 and 24 of the transformer 20 through windings 109 and 110. The energy absorption means which comprises the capacitor 104 and the resistor 103, which control the excitation reaction on the excitation contacts 13, 11, and 12, is of a low impedance. Thus, the value of capacitor 104 is of a greater order of magnitude than is the value of capacitors 25 and 26. Experiments show that capacitor 104 may be thirty times the value of capacitors 25 and 26 to be fully effective. The capacitor 104 and the resistor 103 are connected in parallel with each other and across first and second connection means 116 and 117. In Figure 1, the first connection means 116 is connected through capacitor 45 to the midpoint 38 of the alternating current system of the secondary transformer windings. In Figure 2, the first connection means 116 is connected through the conductor 119 to the midpoint 38. In Figure 1, the second connection means 117 is connected to the midpoint 113 of the diodes 101 and 102 and in Figure 2, the second connection means 117 is connected through capacitor 106 to the midpoint 112 of the diodes 30 and 31.

The current diverting circuit which includes the energy absorption means has a property of low impedance as compared to impedance of the excitation elements or capacitors 25 and 26, which means that the current diverting circuit has a property of diverting energy from the load contacts even with a low voltage across said load contacts. In both Figures 1 and 2, there is no excitation alternating current voltage across the absorption means comprising the capacitor 104 and resistor 103, thereby making possible a practical load absorption circuit having an impedance many times lower than the suppression elements used in the prior art.

While I have characteristic elements 30 and 31 and the elements 101 and 102 as diodes, it is understood that the word "diode" as used in this specification and claims includes conventional thermionic diodes, gaseous conducting diodes, and semi-conducting devices, such as selenium, or germanium rectifying junctions, or other static rectifying devices.

The curve 51 of Figure 3 shows a preferred mode of operation wherein the load current decays in the time differential between the operation of the load contacts and the excitation contacts. In the prior art, the load current decay curve may be shown as in curve 50, which indicates a rapid decay by virtue of the absence of low admittance value elements in some relationship to the load contacts. However, the decay time in my system must not be so long as to require the excitation contacts to interrupt load current.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a vibrator system having a vibrating contact and opposed load interruption contacts and having a transformer provided with first and second secondary windings having a neutral alternating current point therebetween, a load current diverting circuit to divert energy from the load contacts and comprising two diodes, each having first and second terminals, said second terminals being connected together and defining a common point therebetween, first circuit means for connecting the first terminals of the diodes, respectively, to the first and second secondary winding of the transformer to impress a voltage on the diodes, energy absorption means having low impedance, said energy absorption means comprising first and second connection means and capacitor means and resistor means connected in parallel with each other and across said first and second connection means, first circuit means for connecting the first connection means of the energy absorption means to said vibrating contact, and second circuit means for connecting the second connection means of the energy absorption means to the common of the said diodes.

2. In a vibrator system having a vibrating contact and opposed load interruption contacts and having a transformer provided with first and second secondary windings having a neutral alternating current point therebetween, a load current diverting circuit to divert energy from the load contacts and comprising two diodes, each having first and second terminals, said second terminals being connected together and defining a common point therebetween, first circuit means for connecting the first terminals of the diodes, respectively, to the first and second secondary winding of the transformer to impress a voltage on the diodes, first and second capacitor devices, each having first and second connections, said second connections connected together and defining a common connection between said capacitor devices, first current conducting means for connecting the first connection of the first capacitor device to said common point between said diodes, second curent conducting means for connecting the first connection of the second capacitor device to said vibrating contact, energy absorption means having low impedance, said energy absorption means comprising first and second connection means and capacitor means and resistor means connected in parallel with each other and across said first and second connection means, first circuit means for connecting the first connection means of the energy absorption means to the neutral alternating current point, and second circuit means for connecting the second connection means of the energy absorption means to the common connection of said capacitor devices.

3. In a vibrator system having a vibrating contact and first and second opposed load interruption contacts and having a transformer with first and second secondary windings, each of said windings having first and second ends, intermediate connection means for connecting said first end of the windings together, a load current diverting circuit to divert energy from the load contacts and comprising two diodes, each having first and second terminals, said second terminals being connected together and defining a common point, first circuit means for connecting the first terminals of the diodes, respectively, to the second end of the first and second secondary windings, energy absorption means connected between the vibrating contact and the common point of the diodes, and second circuit means for connecting the first and second opposed load interruption contacts, respectively, to the second end of the first and second secondary winding.

4. In a vibrator system having a vibrating contact and first and second opposed load interruption contacts and having a transformer with first and second secondary windings, each of said windings having first and second ends, intermediate connection means for connecting said first end of the windings together, a load current diverting circuit to divert energy from the load contacts and comprising two diodes, each having first and second terminals, said second terminals being connected together and defining a common point, first circuit means for connecting the first terminals of the diodes, respectively, to the second end of the first and second secondary windings, energy absorption means connected between the vibrating contact and the common point of the diodes, second circuit means for connecting the first and second opposed load interruption contacts, respectively, to the second end of the first and second secondary winding, and third circuit means including a capacitor for connecting the vibrating contact to said intermediate connector means.

5. In a vibrator system having a vibrating contact and first and second opposed load interruption contacts and having a transformer with first and second secondary windings, each of said windings having first and second ends, intermediate connection means for connecting said first end of the windings together, a load current diverting circuit to divert energy from the load contacts and comprising two diodes, each having first and second terminals, said second terminals being connected together and defining a common point, first circuit means for connecting the first terminals of the diodes, respectively, to the first end of the first and second secondary windings, said first circuit means including winding means connected respectively in series with the first and second secondary windings, energy absorption means connected between the common point of the diodes and the intermediate connection means, and second circuit means for connecting the first and second opposed load interruption contacts, respectively, to the second end of the first and second secondary winding.

6. In a vibrating system having a vibrator comprising a vibrating contact member and excitation contacts and load contacts and having a transformer comprising a center-tap primary and two center-tap secondary windings, said primary being connected to the excitation contacts, said center-tap secondary winding being connected to the load contacts, and a load energy absorption circuit, said energy absorption circuit comprising two back-to-back diodes connected across said load contacts, and a resistance and capacitor in shunt relationship connected between midpoint of diodes and the vibrating contact member.

7. In a vibrating system having a vibrator comprising a vibrating contact, excitation contacts and load contacts and having a transformer comprising a center-tap primary energized by said excitation contacts and first and second center-tap secondary windings, said first center-tap secondary winding being connected to the load contacts and said second center-tap secondary winding being connected to full-way rectifying means having a midpoint, two output filter capacitors connected in series and having a midpoint therebetween, said filter capacitors being connected between said vibrating contact and said midpoint of the rectifying means, energy absorption means connected between the midpoint of said output filter capacitors and common center taps of all secondary windings, said energy absorption means absorbing the load current inductive energy in the differential time between operation of the load and excitation contacts.

8. A circuit energized from a direct current source and having interrupter means, said circuit comprising a transformer energized from said direct current source and said interrupter means, said transformer having primary winding means including first and second primary windings and having secondary winding means including first and second secondary windings for supplying current to a load, said first and second primary windings being loosely coupled and said first primary winding and said first secondary winding, as a pair, being closely coupled, and said second primary winding and said second secondary winding, as another pair, being closely coupled, and buffer capacitor means connected in shunt relation with winding means on said transformer, said winding means having an intermediate terminal, said buffer capacitor means comprising two portions connected in series and having an intermediate capacitor terminal, and combination means of resistor means and a diode connected in parallel, said combination means being connected between said terminals and transferring energy from said buffer capacitor means to said winding means having said intermediate terminal and opposing the transfer of energy from the direct current source to said buffer capacitor means.

9. A circuit energized from a direct current source and having interrupter means including a vibrating contact and load contacts, said circuit comprising a transformer energized from said direct current source and said interrupter means, said transformer having primary winding means including first and second primary windings and having secondary winding means including first and second secondary windings for supplying current to a load, said first and second primary windings being loosely coupled and said first primary winding and said first secondary winding, as a pair, being closely coupled, and said second primary winding and said second secondary winding, as another pair, being closely coupled, and buffer capacitor means connected in shunt relation with winding means on said transformer, said winding means having an intermediate terminal, said buffer capacitor means comprising two portions connected in series and having an intermediate capacitor terminal, combination means of resistor means and a diode connected in parallel, said combination means being connected between said terminals and transferring energy from said buffer capacitor means to said winding means having said intermediate terminal and opposing the transfer of energy from the direct current source to said buffer capacitor means, a load current diverting circuit to divert energy from the load contacts and comprising two diodes, each having first and second terminals, said second terminals being connected together and defining a common point therebetween, first circuit means for connecting the first terminals of the diodes, respectively, to the first and second secondary winding of the transformer to impress a voltage on the diodes, energy absorption means having low impedance, said energy absorption means comprising first and second connection means and capacitive element means and resistance means connected in parallel with each other and across said first and second connection means, first circuit means for connecting the first connection means of the energy absorption means to said vibrating contact, and second circuit means for connecting the second connection means of the energy absorption means to the common of the said diodes.

10. In a vibrating system having excitation contact means to excite a transformer to produce alternating current and having load contact means to supply a load, buffer capacitor means connected to the load contact means, and energy absorption means including a capacitor means for the load contact means, said capacitor of the absorption means having a larger capacitor value than that of the buffer capacitor means, and means blocking alternating current from flowing through the capacitor of the energy absorption means, said absorption means having a current decay curve of a duration which is substantially equal to the differential time between the opening of the excitation contact means and the opening of the load contact means, said absorption means causing current therein to decrease at a slow rate to substantially zero value at the time the excitation contact means opens.

11. A circuit energized from a direct current source and having interrupter means, said circuit comprising a transformer energized from said direct current source and said interrupter means, said transformer having primary winding means including first and second primary windings and having secondary winding means including first and second secondary windings for supplying current to a load, said first and second primary windings being loosely coupled and said first primary winding and said first secondary winding, as a pair, being closely coupled, and said second primary winding and said second secondary winding, as another pair, being closely coupled, and buffer capacitor means connected in shunt relation with winding means on said transformer, said winding means having an intermediate terminal, said capacitor means comprising two portions connected in series and having an intermediate capacitor terminal, and electrical means interconnecting said intermediate terminals, said electrical means including unidirectional current conducting means for transferring energy from said buffer capacitor means to said winding means having said intermediate terminal and opposing the transfer of energy from the direct current source to said buffer capacitor means.

12. A circuit energized from a direct current source and having interrupter means, said circuit comprising a transformer energized from said direct current source and said interrupter means, said transformer having primary winding means including first and second primary windings and having secondary winding means including first and second secondary windings for supplying current to a load, said first and second primary windings being loosely coupled and said first primary winding and said first secondary winding, as a pair, being closely coupled, and said second primary winding and said second secondary winding, as another pair, being closely coupled, and buffer capacitor means connected in shunt relation with winding means on said transformer, said winding means having an intermediate terminal, said buffer capacitor means comprising two portions connected in series and having an intermediate capacitor terminal, and combination means of resistor means and unidirectional current conducting means connected in parallel, said combination means being connected between said terminals and transferring energy from said buffer capacitor means to said winding means having said intermediate terminal and opposing the transfer of energy from the direct current source to said buffer capacitor means.

References Cited in the file of this patent

UNITED STATES PATENTS

| | | |
|---|---|---|
| 1,960,599 | Silva | May 29, 1934 |
| 2,011,395 | Cain | Aug. 13, 1935 |
| 2,060,025 | Burt et al. | Nov. 10, 1936 |
| 2,255,299 | Rockwell | Sept. 9, 1941 |
| 2,637,769 | Walker | May 5, 1953 |

FOREIGN PATENTS

| | | |
|---|---|---|
| 123,573 | Sweden | Dec. 14, 1948 |